United States Patent
Daike (10) Patent No.: US 12,533,903 B2
(45) Date of Patent: Jan. 27, 2026

(54) COMBINATION OF THERMAL TRANSFER SHEET AND INTERMEDIATE TRANSFER MEDIUM, AND METHOD FOR PRODUCING PRINTED MATERIAL USING COMBINATION

(71) Applicant: Dai Nippon Printing Co., Ltd., Tokyo (JP)

(72) Inventor: Akito Daike, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 245 days.

(21) Appl. No.: 17/753,182

(22) PCT Filed: Aug. 28, 2020

(86) PCT No.: PCT/JP2020/032736
§ 371 (c)(1),
(2) Date: Feb. 23, 2022

(87) PCT Pub. No.: WO2021/049334
PCT Pub. Date: Mar. 18, 2021

(65) Prior Publication Data
US 2022/0194110 A1    Jun. 23, 2022

(30) Foreign Application Priority Data
Sep. 13, 2019 (JP) .................. 2019-167597

(51) Int. Cl.
*B41M 5/382* (2006.01)
*B41M 5/52* (2006.01)

(52) U.S. Cl.
CPC .......... *B41M 5/38235* (2013.01); *B41M 5/52* (2013.01)

(58) Field of Classification Search
CPC ..... B41M 5/38235; B41M 5/52; B41M 5/382
See application file for complete search history.

(56) References Cited

U.S. PATENT DOCUMENTS

2019/0092040 A1 * 3/2019 Yoda .................. B41M 3/06
2019/0160846 A1   5/2019 Yoda et al.

FOREIGN PATENT DOCUMENTS

| EP | 2 805 830 A1 | 11/2014 |
| EP | 3 431 303 A1 | 1/2019 |
| JP | S62-021592 A | 1/1987 |
| JP | H05-096857 A | 4/1993 |
| JP | H07-052522 A | 2/1995 |

(Continued)

OTHER PUBLICATIONS

Machine Translation of WO 2017-146151 A1 (Year: 2017).*

(Continued)

*Primary Examiner* — Mark Ruthkosky
*Assistant Examiner* — Sathavaram I Reddy
(74) *Attorney, Agent, or Firm* — BURR PATENT LAW, PLLC (57) ABSTRACT

A combination of a thermal transfer sheet and an intermediate transfer medium according to the present disclosure is characterized in that the thermal transfer sheet includes a first substrate and a melt transfer coloring layer, the intermediate transfer medium includes a second substrate and a transfer layer including a receiving layer, and the melt transfer coloring layer and the receiving layer contain a release material.

7 Claims, 3 Drawing Sheets

(56) References Cited

FOREIGN PATENT DOCUMENTS

| JP | H07-156532 A | 6/1995 | | |
|---|---|---|---|---|
| JP | 2015047697 A | * | 3/2015 | ............ B32B 27/36 |
| KR | 10-2018-0114003 A | | 10/2018 | |
| WO | WO-2017146151 A1 | * | 8/2017 | ............ B32B 27/20 |
| WO | WO-2017159805 A1 | * | 9/2017 | ............ B32B 27/00 |

OTHER PUBLICATIONS

Machine Translation of JP-2015047697-A (Year: 2015).*
Extended European Search Report dated Sep. 8, 2023 (Application No. 20863042.6).
International Search Report and Written Opinion (Application No. PCT/JP2020/032736) dated Nov. 24, 2020.
Japanese Office Action (Application No. 2021-504846) dated Apr. 23, 2021 (with English translation).
English translation of International Preliminary Report on Patentability (Chapter I) (Application No. PCT/JP2020/032736) dated Mar. 24, 2022, 5 pages.
Korean Office Action (with English translation) dated Apr. 22, 2024 (Application No. 10-2022-7008758).

* cited by examiner

Fig. 10

COMBINATION OF THERMAL TRANSFER SHEET AND INTERMEDIATE TRANSFER MEDIUM, AND METHOD FOR PRODUCING PRINTED MATERIAL USING COMBINATION

TECHNICAL FIELD

The present disclosure relates to a combination of a thermal transfer sheet and an intermediate transfer medium, and a method for producing a printed material using the combination.

BACKGROUND ART

Various thermal transfer recording methods, such as a hot-melt transfer method, have been known. In the hot-melt transfer method, for example, an image is formed by superimposing a thermal transfer sheet including a melt transfer coloring layer on a transfer-receiving article, then passing them between a thermal head and a platen roller of a thermal transfer printer, and heating the thermal transfer sheet with the thermal head to transfer the melt transfer coloring layer onto the transfer-receiving article. A printed material is produced in this way.

Printed materials are also widely produced by using a combination of a thermal transfer sheet including a melt transfer coloring layer and an intermediate transfer medium including a transfer layer.

More specifically, an image is formed by first superimposing a thermal transfer sheet on an intermediate transfer medium, then passing them between a thermal head and a platen roller of a thermal transfer printer, and heating the thermal transfer sheet with the thermal head to transfer a melt transfer coloring layer onto a transfer layer including a receiving layer of the intermediate transfer medium. The intermediate transfer medium is then heated to transfer the transfer layer and the melt transfer coloring layer forming an image on the transfer layer onto a transfer-receiving article. A printed material is produced in this way.

In such production of a printed material, the temperature of the thermal head rises at an image forming position on a transfer-receiving article, and the melt transfer coloring layer is transferred onto the transfer-receiving article. When the temperature is increased from an excessively low temperature, however, the temperature of the thermal head does not reach the transfer temperature of the melt transfer coloring layer, and the melt transfer coloring layer may not be successfully transferred at the image forming position. To avoid such a problem, the temperature of the thermal head is generally maintained at a certain temperature that is equal to or lower than the transfer temperature of the melt transfer coloring layer but is not too low even at a position on which an image is not formed.

SUMMARY OF INVENTION

Technical Problem

As described above, when the thermal transfer sheet and the intermediate transfer medium are passed between the thermal head and the platen roller, the thermal head is maintained at a moderately high temperature even at the position on which an image is not formed. The thermal transfer sheet and the intermediate transfer medium in close contact with each other are transported between the thermal head maintained at the moderately high temperature and the platen roller.

Thus, at the position on which an image is not formed, the melt transfer coloring layer of the thermal transfer sheet may adhere to the receiving layer of the intermediate transfer medium, and the transfer layer including the receiving layer and the like may be separated from the intermediate transfer medium (hereinafter referred to as transfer layer peeling). Furthermore, at the position on which an image is not formed, a coloring material contained in the melt transfer coloring layer of the thermal transfer sheet may move onto the receiving layer of the intermediate transfer medium (hereinafter referred to as scumming). The present inventors have found a new problem that transfer layer peeling or scumming impairs the appearance of a printed material.

An object of the present disclosure is to provide a combination of a thermal transfer sheet and an intermediate transfer medium that can effectively prevent transfer layer peeling and scumming at a position on which an image is not formed.

Another object of the present disclosure is to provide a method for producing a printed material using the combination of the thermal transfer sheet and the intermediate transfer medium.

Solution to Problem

A combination of a thermal transfer sheet and an intermediate transfer medium according to the present disclosure is characterized in that the thermal transfer sheet includes a first substrate and a melt transfer coloring layer, the intermediate transfer medium includes a second substrate and a transfer layer including a receiving layer, and the melt transfer coloring layer and the receiving layer contain a release material.

A method for producing a printed material according to the present disclosure includes the steps of: providing the combination of the thermal transfer sheet and the intermediate transfer medium; transferring the melt transfer coloring layer from the thermal transfer sheet onto the receiving layer of the intermediate transfer medium to form an image; and transferring the transfer layer including the receiving layer, onto which the melt transfer coloring layer is transferred, from the intermediate transfer medium onto a transfer-receiving article.

Advantageous Effects of Invention

The present disclosure can provide a combination of a thermal transfer sheet and an intermediate transfer medium that can effectively prevent transfer layer peeling and scumming at a position on which an image is not formed.

The present disclosure can provide a method for producing a printed material using the combination of the thermal transfer sheet and the intermediate transfer medium.

DESCRIPTION OF EMBODIMENTS (Combination of Thermal Transfer Sheet and Intermediate Transfer Medium)

An embodiment of a combination of a thermal transfer sheet and an intermediate transfer medium according to the present disclosure is described with reference to the accompanying drawings.

Figure 1:
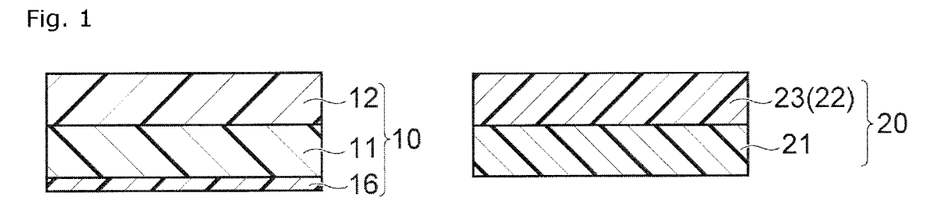
FIG. 1 is a schematic cross-sectional view of an embodiment of a combination of a thermal transfer sheet and an intermediate transfer medium according to the present disclosure.
Figure 6:
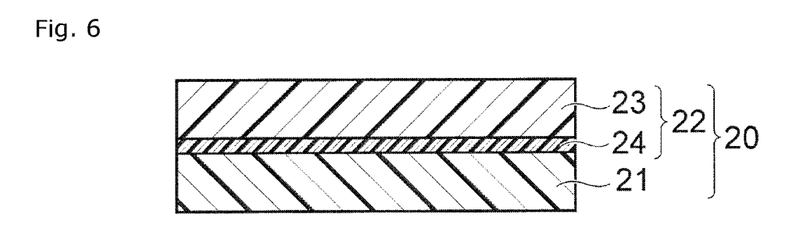
FIG. 6 is a schematic cross-sectional view of an embodiment of an intermediate transfer medium constituting a combination of a thermal transfer sheet and the intermediate transfer medium according to the present disclosure.
Figure 7:
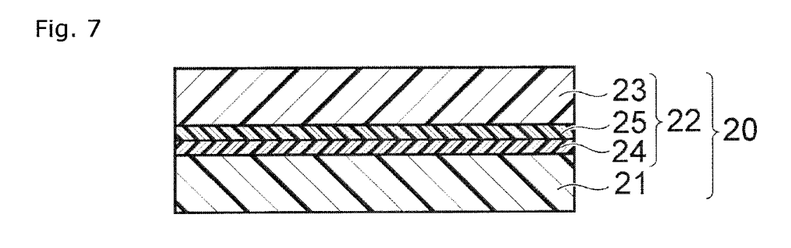
FIG. 7 is a schematic cross-sectional view of an embodiment of an intermediate transfer medium constituting a combination of a thermal transfer sheet and the intermediate transfer medium according to the present disclosure.

FIG. 1 is a schematic cross-sectional view of an embodiment of a combination of a thermal transfer sheet and an intermediate transfer medium according to the present disclosure. FIGS. 2 to 5 are schematic cross-sectional views of an embodiment of the thermal transfer sheet. FIGS. 6 and 7 are schematic cross-sectional views of an embodiment of the intermediate transfer medium.

As illustrated in FIG. 1, a combination of a thermal transfer sheet 10 and an intermediate transfer medium 20 according to the present disclosure includes the thermal transfer sheet 10 including a first substrate 11 and a melt transfer coloring layer 12 located on the first substrate 11, and the intermediate transfer medium 20 including a second substrate 21 and a transfer layer 22. The transfer layer 22 includes at least a receiving layer 23.

Figure 2:
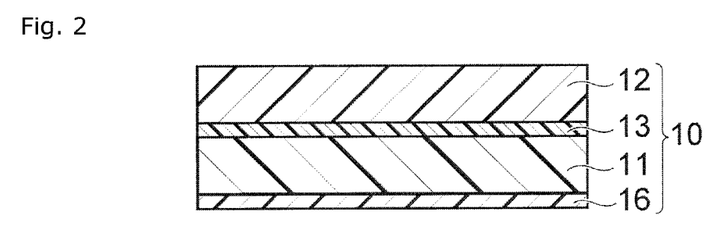
FIG. 2 is a schematic cross-sectional view of an embodiment of a thermal transfer sheet constituting a combination of the thermal transfer sheet and an intermediate transfer medium according to the present disclosure.
Figure 3:
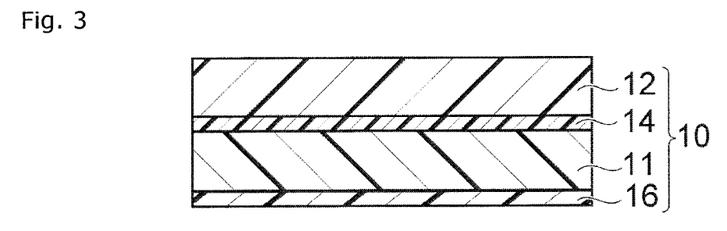
FIG. 3 is a schematic cross-sectional view of an embodiment of a thermal transfer sheet constituting a combination of the thermal transfer sheet and an intermediate transfer medium according to the present disclosure.
Figure 4:
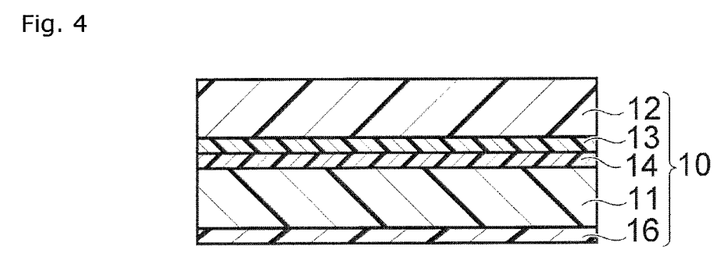
FIG. 4 is a schematic cross-sectional view of an embodiment of a thermal transfer sheet constituting a combination of the thermal transfer sheet and an intermediate transfer medium according to the present disclosure.

In one embodiment, as illustrated in FIG. 2, the thermal transfer sheet 10 includes a peeling layer 13 between the first substrate 11 and the melt transfer coloring layer 12. In one embodiment, as illustrated in FIG. 3, the thermal transfer sheet 10 includes a release layer 14 between the first substrate 11 and the melt transfer coloring layer 12. When the thermal transfer sheet 10 includes the peeling layer 13 and the release layer 14, as illustrated in FIG. 4, the release layer 14 and the peeling layer 13 are located in this order between the first substrate 11 and the melt transfer coloring layer 12.

Figure 5:
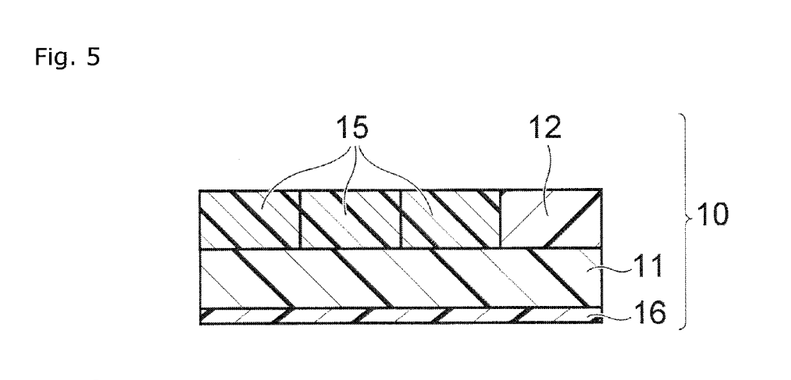
FIG. 5 is a schematic cross-sectional view of an embodiment of a thermal transfer sheet constituting a combination of the thermal transfer sheet and an intermediate transfer medium according to the present disclosure.

In one embodiment, as illustrated in FIG. 5, the thermal transfer sheet 10 includes a sublimation transfer coloring layer 15 in a plane sequential manner with the melt transfer coloring layer 12. As illustrated in FIG. 5, a plurality of sublimation transfer coloring layers 15 may be provided.

In one embodiment, as illustrated in FIGS. 1 to 5, the thermal transfer sheet 10 includes a back layer 16 on the opposite surface of the first substrate 11 from the surface on which the melt transfer coloring layer 12 is provided.

In one embodiment, as illustrated in FIG. 6, the transfer layer 22 of the intermediate transfer medium 20 includes a peeling layer 24 under the receiving layer 23.

In one embodiment, as illustrated in FIG. 7, the transfer layer 22 of the intermediate transfer medium 20 includes a protective layer 25 under the receiving layer 23. When the transfer layer 22 includes the peeling layer 24 and the protective layer 25, as illustrated in FIG. 7, the protective layer 25 and the peeling layer 24 are located in this order under the receiving layer 23.

Each layer of the thermal transfer sheet and the intermediate transfer medium is described below. Each layer may contain one or two or more of the components described below.

(Thermal Transfer Sheet)

The thermal transfer sheet includes a first substrate and a melt transfer coloring layer located on the first substrate. In one embodiment, the thermal transfer sheet includes a peeling layer between the first substrate and the melt transfer coloring layer. In one embodiment, the thermal transfer sheet includes a release layer between the first substrate and the melt transfer coloring layer or between the first substrate and the peeling layer. In one embodiment, the thermal transfer sheet includes a sublimation transfer coloring layer in a plane sequential manner with the melt transfer coloring layer. In one embodiment, the thermal transfer sheet includes a back layer on the opposite surface of the first substrate from the surface on which the melt transfer coloring layer is provided.

(First Substrate)

The first substrate may be any substrate that has heat resistance to withstand thermal energy applied during thermal transfer (for example, heat generated by a thermal head), mechanical strength to support a coloring layer and the like on the first substrate, and solvent resistance.

The first substrate may be a film comprising a resin (hereinafter referred to simply as a "resin film"). Examples of the resin include polyesters, such as poly(ethylene terephthalate) (PET), poly(butylene terephthalate) (PBT), poly(ethylene naphthalate) (PEN), 1,4-poly(cyclohexylenedimethylene terephthalate), and terephthalic acid-cyclohexanedimethanol-ethylene glycol copolymers; polyamides, such as nylon 6 and nylon 6,6; polyolefins, such as polyethylene (PE), polypropylene (PP) and polymethylpentene; vinyl resins, such as poly(vinyl chloride), poly(vinyl alcohol) (PVA), poly(vinyl acetate), vinyl chloride-vinyl acetate copolymers, poly(vinyl butyral), and polyvinylpyrrolidone (PVP); (meth)acrylic resins, such as polyacrylates, polymethacrylates, and poly(methyl methacrylate); imide resins, such as polyimides and polyetherimides; cellulose resins, such as cellophane, cellulose acetate, nitrocellulose, cellulose acetate propionate (CAP), and cellulose acetate butyrate (CAB); styrene resins, such as polystyrene (PS); polycarbonates; and ionomer resins.

Among these resins, in terms of heat resistance and mechanical strength, polyesters, such as PET and PEN, are preferred, and PET is particularly preferred.

In the present disclosure, "(meth)acrylic" includes both "acrylic" and "methacrylic". "(Meth)acrylate" includes both "acrylate" and "methacrylate".

The first substrate may be a laminate of the resin films. The laminate of the resin films can be formed by a dry lamination method, a wet lamination method, or an extrusion method.

When the first substrate is a resin film, the resin film may be a stretched film or an unstretched film. The resin film is preferably a uniaxially or biaxially stretched film in terms of strength.

The first substrate preferably has a thickness in the range of 2 to 25 µm, more preferably 3 to 10 µm. This can improve the mechanical strength of the first substrate and the transfer of thermal energy during thermal transfer.

(Melt Transfer Coloring Layer)

The thermal transfer sheet includes a melt transfer coloring layer containing a release material on the first substrate.

Examples of the release material include fluorine compounds, phosphoric acid ester compounds, silicone oils, higher fatty acid amide compounds, metallic soaps, and waxes, such as paraffin waxes.

Among these, silicone oils are preferred in terms of transfer layer peeling inhibitory properties and scumming inhibitory properties.

The melt transfer coloring layer may contain two or more release materials.

Examples of the silicone oils include straight silicon oils, such as dimethyl silicone oil and methylphenyl silicone oil; and modified silicone oils, such as amino-modified silicone oils, epoxy-modified silicone oils, carboxy-modified silicone oils, (meth)acrylic-modified silicone oils, mercapto-modified silicone oils, carbinol-modified silicone oils, fluorine-modified silicone oils, methylstyryl-modified silicone oils, and polyether-modified silicone oils. The modified silicone oils may be of one-end type, both-end type, or side-chain one-end type.

Among these, modified silicone oils are preferred, and epoxy-modified silicone oils are particularly preferred, in terms of transfer layer peeling inhibitory properties and scumming inhibitory properties.

The melt transfer coloring layer preferably has a release material content (A) in the range of 0.5% to 10% by mass, more preferably 1% to 5% by mass, particularly preferably 1% to 4% by mass. This can further improve the transfer layer peeling inhibitory properties and scumming inhibitory properties. This can also improve the adhesion between the melt transfer coloring layer and the receiving layer and reduce blurring or the like in an image formed.

The melt transfer coloring layer contains a coloring material.

The coloring material may be a pigment or a dye.

Examples of the coloring material include carbon black, acetylene black, lampblack, graphite, iron black, aniline black, silica, calcium carbonate, titanium oxide, cadmium red, cadmopone red, chromium red, vermilion, colcothar, azo pigments, alizarin lake, quinacridone, cochineal lake perylene, yellow ochre, aureolin, cadmium yellow, cadmium orange, chromium yellow, zinc yellow, Naples yellow, nickel yellow, azo pigments, greenish yellow, ultramarine, mountain blue, cobalt, phthalocyanine, anthraquinone, indigoid, cinnabar green, cadmium green, chromium green, phthalocyanine, azomethine, perylene, and aluminum pigments.

The coloring material content of the melt transfer coloring layer preferably ranges from 10% to 50% by mass, more preferably 20% to 45% by mass. This can improve the image density on the receiving layer.

In one embodiment, the melt transfer coloring layer contains a resin material. Examples of the resin material include polyesters, polyamides, polyolefins, vinyl resins, vinyl acetal resins, (meth)acrylic resins, cellulose resins, styrene resins, polycarbonates, phenoxy resins, and ionomer resins.

Among these, in terms of adhesiveness to the receiving layer, vinyl resins are preferred, and vinyl chloride-vinyl acetate copolymers are particularly preferred.

The resin material content of the melt transfer coloring layer preferably ranges from 20% to 75% by mass, more preferably 30% to 60% by mass. This can further improve the adhesion between the melt transfer coloring layer and the receiving layer.

The melt transfer coloring layer may contain additive materials, such as a filler, a plasticizing material, an ultraviolet absorbing material, inorganic particles, organic particles, and a dispersing material.

The melt transfer coloring layer preferably has a thickness in the range of 0.1 to 5 µm, more preferably 0.5 to 2 µm. This can further improve the transfer layer peeling inhibitory properties and scumming inhibitory properties. This can also improve the adhesion between the melt transfer coloring layer and the receiving layer and reduce blurring or the like in an image formed.

In one embodiment, the melt transfer coloring layer can be formed by dispersing or dissolving the above materials in water or an appropriate organic solvent to prepare a coating liquid, applying the coating liquid to the first substrate or the like by a known coating means to form a coating film, and drying the coating film. The known coating means may be a roll coating method, a reverse roll coating method, a gravure coating method, a reverse gravure coating method, a bar coating method, or a rod coating method.

(Peeling Layer)

The peeling layer is a layer that is located between the first substrate and the melt transfer coloring layer and that is transferred together with the melt transfer coloring layer when the melt transfer coloring layer is transferred onto the receiving layer of the intermediate transfer medium. The peeling layer is provided to improve the transferability of the melt transfer coloring layer.

In one embodiment, the peeling layer contains a resin material. Examples of the resin material include polyesters, polyamides, polyolefins, vinyl resins, (meth)acrylic resins, imide resins, cellulose resins, styrene resins, polycarbonates, and ionomer resins.

The resin material content of the peeling layer may range from 50% to 99% by mass, for example.

In one embodiment, the peeling layer contains the release material. This can further improve the transferability of the melt transfer coloring layer.

The release material content of the peeling layer preferably ranges from 0.1% to 10% by mass, more preferably 0.5% to 5% by mass. This can further improve the transferability of the melt transfer coloring layer.

The peeling layer may contain the additive materials.

The peeling layer preferably has a thickness in the range of 0.1 to 3 µm, more preferably 0.3 to 1.5 µm. This can further improve the transferability of the melt transfer coloring layer.

In one embodiment, the peeling layer can be formed by dispersing or dissolving the above materials in water or an appropriate organic solvent to prepare a coating liquid, applying the coating liquid to the first substrate or the like by the known coating means to form a coating film, and drying the coating film.

(Release Layer)

The release layer is a layer that is located between the first substrate and the melt transfer coloring layer and that remains on the first substrate when the melt transfer coloring layer is transferred onto the receiving layer of the intermediate transfer medium. The release layer is provided to improve the transferability of the melt transfer coloring layer.

In one embodiment, the release layer contains a resin material. Examples of the resin material include (meth) acrylic resins, polyurethanes, acetal resins, polyamides, polyesters, melamine resins, polyol resins, cellulose resins, and silicone resins.

The release layer may contain at least one component selected from the release materials and the additive materials.

The release layer preferably has a thickness in the range of 0.1 to 2 μm.

In one embodiment, the release layer can be formed by dispersing or dissolving the above materials in water or an appropriate organic solvent to prepare a coating liquid, applying the coating liquid to the first substrate by the known coating means to form a coating film, and drying the coating film.

(Sublimation Transfer Coloring Layer)

In one embodiment, the thermal transfer sheet according to the present disclosure includes a sublimation transfer coloring layer on a first substrate in a plane sequential manner with the melt transfer coloring layer.

The sublimation transfer coloring layer contains a sublimation dye. Examples of the sublimation dye include diarylmethane dyes, triarylmethane dyes, thiazole dyes, merocyanine dyes, pyrazolone dyes, methine dyes, indoaniline dyes, acetophenone azomethine dyes, pyrazoloazomethine dyes, xanthene dyes, oxazine dyes, thiazine dyes, azine dyes, acridine dyes, azo dyes, spiropyran dyes, indolinospiropyran dyes, fluoran dyes, naphthoquinone dyes, anthraquinone dyes, and quinophthalone dyes.

In one embodiment, the sublimation transfer coloring layer contains a resin material. Examples of the resin material include (meth)acrylic resins, polyurethanes, acetal resins, polyamides, polyesters, melamine resins, polyol resins, cellulose resins, and silicone resins.

In one embodiment, the sublimation transfer coloring layer contains the release material. This can reduce the adhesion between the receiving layer of the intermediate transfer medium and the sublimation transfer coloring layer during image formation.

The release material content of the sublimation transfer coloring layer preferably ranges from 0.01% to 1% by mass, more preferably 0.05% to 0.5% by mass. This can further reduce the adhesion between the receiving layer of the intermediate transfer medium and the sublimation transfer coloring layer during image formation.

The sublimation transfer coloring layer may contain the additive materials.

In one embodiment, the sublimation transfer coloring layer can be formed by dispersing or dissolving the above materials in water or an appropriate organic solvent to prepare a coating liquid, applying the coating liquid to the first substrate or the like by the known coating means to form a coating film, and drying the coating film.

(Back Layer)

In one embodiment, the thermal transfer sheet according to the present disclosure includes a back layer on the opposite surface of the first substrate from the surface on which the melt transfer coloring layer and the like is provided. This can reduce the occurrence of sticking and wrinkles due to heating during thermal transfer.

In one embodiment, the back layer contains a resin material. Examples of the resin material include vinyl resins, polyesters, polyamides, polyolefins, (meth)acrylic resins, polyolefins, polyurethanes, cellulose resins, and phenolic resins.

In one embodiment, the back layer contains an isocyanate compound. Examples of the isocyanate compounds include xylene diisocyanate, toluene diisocyanate, isophorone diisocyanate, and hexamethylene diisocyanate.

The back layer may contain at least one component selected from the release materials and the additive materials.

The back layer preferably has a thickness in the range of 0.3 to 3 μm.

In one embodiment, the back layer can be formed by dispersing or dissolving the above materials in water or an appropriate organic solvent to prepare a coating liquid, applying the coating liquid to the first substrate by the known coating means to form a coating film, and drying the coating film.

(Intermediate Transfer Medium)

The intermediate transfer medium includes a second substrate and a transfer layer including at least a receiving layer. In one embodiment, the transfer layer of the intermediate transfer medium includes a peeling layer under the receiving layer as a layer closest to the second substrate. In one embodiment, the transfer layer includes a protective layer under the receiving layer. When the transfer layer includes both the peeling layer and the protective layer, the transfer layer includes the peeling layer, the protective layer, and the receiving layer in this order from the second substrate side.

(Second Substrate)

The second substrate may be a substrate that can be used for the first substrate.

The second substrate preferably has a thickness in the range of 1 to 50 μm, more preferably 6 to 25 μm. This can effectively reduce the occurrence of thermal wrinkling on the transfer layer while maintaining the transferability of the transfer layer when the transfer layer is transferred from the intermediate transfer medium to the transfer-receiving layer.

(Receiving Layer)

The receiving layer contains the release material. The release material is preferably a silicone oil, more preferably a modified silicone oil, particularly preferably an epoxy-modified silicone oil, among those described above. The release material contained in the receiving layer may be the same as or different from the release material contained in the melt transfer coloring layer.

The receiving layer preferably has a release material content (B) in the range of 0.5% to 17% by mass, more preferably 1% to 12% by mass, particularly preferably 1% to 9% by mass. This can further improve the transfer layer peeling inhibitory properties and scumming inhibitory properties. This can also improve the adhesion between the melt transfer coloring layer and the receiving layer and reduce blurring or the like in an image formed.

The ratio (B/A) of the release material content (B) of the receiving layer to the release material content (A) of the melt transfer coloring layer preferably ranges from 0.2 to 12, more preferably 0.3 to 11, particularly preferably 0.3 to 3. This can further improve the transfer layer peeling inhibitory properties and scumming inhibitory properties. This can also improve the adhesion between the melt transfer coloring layer and the receiving layer and reduce blurring or the like in an image formed.

The sum (A+B) of the release material content (A) of the melt transfer coloring layer and the release material content (B) of the receiving layer preferably ranges from 2% to 13% by mass, more preferably 3% to 11.5% by mass, particularly preferably 3% to 9% by mass. This can further improve the transfer layer peeling inhibitory properties and scumming inhibitory properties. This can also improve the adhesion between the melt transfer coloring layer and the receiving layer and reduce blurring or the like in an image formed.

In one embodiment, the receiving layer contains a resin material. Examples of the resin material include polyolefins, vinyl resins, such as poly(vinyl chloride) and vinyl chloride-vinyl acetate copolymers, (meth)acrylic resins, cellulose resins, polyesters, polyamides, polycarbonates, styrene resins, epoxy resins, polyurethanes, epoxy resins, and ionomer resins.

Among these, in terms of adhesiveness to the melt transfer coloring layer and receptivity to the sublimation dye, vinyl resins are preferred, and vinyl chloride-vinyl acetate copolymers are particularly preferred.

The resin material content of the receiving layer preferably ranges from 80% to 99.5% by mass, more preferably 85% to 99% by mass. This can further improve the adhesiveness to the melt transfer coloring layer and the receptivity to the sublimation dye.

The receiving layer may contain the additive materials.

The receiving layer preferably has a thickness in the range of 0.5 to 20 μm, more preferably 1 to 10 μm. This can further improve the transfer layer peeling inhibitory properties and scumming inhibitory properties. This can also improve the adhesion between the melt transfer coloring layer and the receiving layer and reduce blurring or the like in an image formed. This can also improve the image density.

In one embodiment, the receiving layer can be formed by dispersing or dissolving the above materials in water or an appropriate organic solvent to prepare a coating liquid, applying the coating liquid to a layer on the second substrate or the like by the known coating means to form a coating film, and drying the coating film.

(Peeling Layer)

In one embodiment, the transfer layer includes a peeling layer. The peeling layer is a layer that is transferred from the intermediate transfer medium onto a transfer-receiving article and that is to be located on the top of a printed material.

In one embodiment, the peeling layer contains a resin material. Examples of the resin materials include polyesters, polyamides, polyolefins, vinyl resins, (meth)acrylic resins, imide resins, cellulose resins, styrene resins, polycarbonates, and ionomer resins.

The peeling layer may contain at least one component selected from the release materials and the additive materials.

In one embodiment, the peeling layer can be formed by dispersing or dissolving the above materials in water or an appropriate organic solvent to prepare a coating liquid, applying the coating liquid to the second substrate by the known coating means to form a coating film, and drying the coating film.

(Protective Layer)

In one embodiment, the transfer layer of the intermediate transfer medium includes a protective layer between the peeling layer and the receiving layer.

In one embodiment, the protective layer contains a resin material. Examples of the resin materials include polyesters, (meth)acrylic resins, epoxy resins, styrene resins, acrylic polyol resins, polyurethanes, ionizing radiation curable resins, and ultraviolet absorbing resins.

The protective layer may contain the additive materials.

The protective layer preferably has a thickness in the range of 0.5 to 7 μm, more preferably 1 to 5 μm. This can further improve the durability of the protective layer.

The protective layer can be formed by dispersing or dissolving the above materials in water or an appropriate organic solvent to prepare a coating liquid, applying the coating liquid to the second substrate or the like by the known coating means to form a coating film, and drying the coating film.

(Method for Producing Printed Material)

A method for producing a printed material according to the present disclosure includes the steps of: providing the combination of the thermal transfer sheet and the intermediate transfer medium; transferring the melt transfer coloring layer from the thermal transfer sheet onto the receiving layer of the intermediate transfer medium to form an image; and transferring the transfer layer including the receiving layer, onto which the melt transfer coloring layer is transferred, from the intermediate transfer medium onto a transfer-receiving article.

The steps of a method for producing a printed material according to the present disclosure are described below.

(Step of Providing Thermal Transfer Sheet and Intermediate Transfer Medium)

The method for producing a printed material according to the present disclosure includes the step of providing the thermal transfer sheet and the intermediate transfer medium. Methods for producing the thermal transfer sheet and the intermediate transfer medium are described above and are not described here.

(Image Formation Step)

The method for producing a printed material according to the present disclosure includes the step of transferring the melt transfer coloring layer from the thermal transfer sheet onto the receiving layer of the intermediate transfer medium to form an image.

When the thermal transfer sheet includes a sublimation transfer coloring layer, a sublimation dye may be sublimated and transferred from the sublimation transfer coloring layer onto the receiving layer to form an image, and then the melt transfer coloring layer may be transferred to form another image.

The transfer can be performed by a known method using a commercial thermal transfer printer or the like with a thermal head and a platen roller.

(Step of Transferring onto Transfer-Receiving Article)

The method for producing a printed material according to the present disclosure includes the step of transferring the transfer layer including the receiving layer, onto which the melt transfer coloring layer is transferred, from the intermediate transfer medium onto a transfer-receiving article. The transfer can be performed by a known method using a commercial thermal transfer printer or the like.

The transfer-receiving article can be appropriately selected according to the intended use and may be a paper substrate, such as high-quality paper, art paper, coated paper, resin-coated paper, cast-coated paper, paperboard, synthetic paper, or impregnated paper, or the resin film, or a laminate thereof.

The present disclosure relates to the following [1] to [8], for example.

[1] A combination of a thermal transfer sheet and an intermediate transfer medium, the thermal transfer sheet including a first substrate and a melt transfer coloring layer, the intermediate transfer medium including a second substrate and a transfer layer including a receiving layer, and the melt transfer coloring layer and the receiving layer containing a release material.

[2] The combination of the thermal transfer sheet and the intermediate transfer medium according to [1], wherein the melt transfer coloring layer has a release material content (A) in the range of 0.5% to 10% by mass.

[3] The combination of the thermal transfer sheet and the intermediate transfer medium according to [1] or [2], wherein the receiving layer has a release material content (B) in the range of 0.5% to 17% by mass.

[4] The combination of the thermal transfer sheet and the intermediate transfer medium according to any one of [1] to [3], wherein a ratio (B/A) of a release material content (B) of the receiving layer to a release material content (A) of the melt transfer coloring layer ranges from 0.2 to 12.

[5] The combination of the thermal transfer sheet and the intermediate transfer medium according to any one of [1] to [4], wherein a sum (A+B) of a release material content (A) of the melt transfer coloring layer and a release material content (B) of the receiving layer ranges from 2% to 13% by mass.

[6] The combination of the thermal transfer sheet and the intermediate transfer medium according to any one of [1] to [5], wherein the release material is a silicone oil.

[7] The combination of the thermal transfer sheet and the intermediate transfer medium according to any one of [1] to [6], wherein the melt transfer coloring layer and the receiving layer contain a vinyl resin.

[8] A method for producing a printed material, including the steps of: providing the combination of the thermal transfer sheet and the intermediate transfer medium according to any one of [1] to [7]; transferring the melt transfer coloring layer from the thermal transfer sheet onto the receiving layer of the intermediate transfer medium to form an image; and transferring the transfer layer including the receiving layer, onto which the melt transfer coloring layer is transferred, from the intermediate transfer medium onto a transfer-receiving article.

EXAMPLES

The combination of the thermal transfer sheet and the intermediate transfer medium according to the present disclosure and the like are described in more detail in the following examples. However, the combination and the like are not limited to these examples.

Example 1

[Production of Thermal Transfer Sheet]

A PET film with a thickness of 6 μm was provided as a first substrate. Coating liquids A, B, and C with the following compositions for forming sublimation transfer coloring layers were applied to one surface of the first substrate in a plane sequential manner and were dried to form sublimation transfer coloring layers A, B, and C each with a thickness of 0.7 μm.

<Coating Liquid A for Forming Sublimation Transfer Coloring Layer>

| | |
|---|---|
| Yellow sublimation dye | 6 parts by mass |
| Poly(vinyl acetal) | 4 parts by mass |
| (S-Lec (registered trademark) KS-6 manufactured by Sekisui Chemical Co., Ltd.) | |
| Methyl ethyl ketone (MEK) | 45 parts by mass |
| Toluene | 45 parts by mass |

<Coating Liquid B for Forming Sublimation Transfer Coloring Layer>

| | |
|---|---|
| Magenta sublimation dye | 6 parts by mass |
| Poly(vinyl acetal) | 4 parts by mass |
| (S-Lec (registered trademark) KS-6 manufactured by Sekisui Chemical Co., Ltd.) | |
| MEK | 45 parts by mass |
| Toluene | 45 parts by mass |

<Coating Liquid C for Forming Sublimation Transfer Coloring Layer>

| | |
|---|---|
| Cyan sublimation dye | 6 parts by mass |
| Poly(vinyl acetal) | 4 parts by mass |
| (S-Lec (registered trademark) KS-6 manufactured by Sekisui Chemical Co., Ltd.) | |
| MEK | 45 parts by mass |
| Toluene | 45 parts by mass |

A coating liquid with the following composition for forming a release layer was applied to the first substrate, on which the sublimation transfer coloring layers A, B, and C were formed, in a plane sequential manner with the sublimation transfer coloring layers thus formed, and was dried to form a release layer with a thickness of 0.2 μm.

<Coating Liquid for Forming Release Layer>

| | |
|---|---|
| Urethane resin | 23 parts by mass |
| (glass transition temperature (Tg): −30° C.) | |
| Urethane resin | 7 parts by mass |
| (Tg: 92° C.) | |
| Poly(vinyl acetal) | 70 parts by mass |
| (S-Lec (registered trademark) KS-5 manufactured by Sekisui Chemical Co., Ltd.) | |
| MEK | 950 parts by mass |
| Toluene | 950 parts by mass |

A coating liquid with the following composition for forming a peeling layer was applied to the release layer thus formed and was dried to form a peeling layer with a thickness of 0.6 μm.

<Coating Liquid for Forming Peeling Layer>

| | |
|---|---|
| Vinyl chloride-vinyl acetate copolymer | 85 parts by mass |
| (Solbin (registered trademark) CNL manufactured by Nissin Chemical Industry Co., Ltd.) | |
| Acrylic resin | 15 parts by mass |
| (Vanaresin GH-8701 manufactured by Shin-Nakamura Chemical Co., Ltd.) | |
| Epoxy-modified silicone oil | 2 parts by mass |
| (KP-1800U manufactured by Shin-Etsu Chemical Co., Ltd.) | |
| MEK | 150 parts by mass |
| Toluene | 150 parts by mass |

A coating liquid with the following composition for forming a melt transfer coloring layer was applied to the peeling layer thus formed and was dried to form a melt transfer coloring layer with a thickness of 0.8 μm.
<Coating Liquid for Forming Melt Transfer Coloring Layer>

| | |
|---|---|
| Vinyl chloride-vinyl acetate copolymer (Solbin (registered trademark) CNL manufactured by Nissin Chemical Industry Co., Ltd.) | 60 parts by mass |
| Epoxy-modified silicone oil (KP-1800U manufactured by Shin-Etsu Chemical Co., Ltd.) | 1 part by mass |
| Carbon black | 40 parts by mass |
| Toluene | 100 parts by mass |

A coating liquid with the following composition for forming a back layer was applied to the other surface of the first substrate and was dried to form a back layer with a thickness of 1 μm. Thus, a thermal transfer sheet was obtained.
<Coating Liquid for Forming Back Layer>

| | |
|---|---|
| Poly(vinyl butyral) (S-Lec (registered trademark) BX-1 manufactured by Sekisui Chemical Co., Ltd.) | 20 parts by mass |
| Polyisocyanate (Burnock (registered trademark) D750 manufactured by DIC Corporation) | 44 parts by mass |
| Phosphate surfactant (Plysurf (registered trademark) A208N manufactured by Dai-ichi Kogyo Seiyaku Co., Ltd.) | 13 parts by mass |
| Talc (Micro Ace (registered trademark) P-3 manufactured by Nippon Talc Co., Ltd.) | 3 parts by mass |
| MEK | 460 parts by mass |
| Toluene | 460 parts by mass |

[Production of Intermediate Transfer Medium]

A PET film with a thickness of 12 μm was provided as a second substrate. A coating liquid with the following composition for forming a peeling layer was applied to a surface of the second substrate and was dried to form a peeling layer with a thickness of 1.6 μm.
<Coating Liquid for Forming Peeling Layer>

| | |
|---|---|
| Vinyl chloride-vinyl acetate copolymer (Solbin (registered trademark) CNL manufactured by Nissin Chemical Industry Co., Ltd.) | 85 parts by mass |
| (Meth)acrylic resin (Vanaresin GH-8701 manufactured by Shin-Nakamura Chemical Co., Ltd.) | 15 parts by mass |
| Epoxy-modified silicone oil (KP-1800U manufactured by Shin-Etsu Chemical Co., Ltd.) | 2 parts by mass |
| MEK | 150 parts by mass |
| Toluene | 150 parts by mass |

A coating liquid with the following composition for forming a protective layer was applied to the peeling layer thus formed and was dried to form a protective layer with a thickness of 4 μm.
<Coating Liquid for Forming Protective Layer>

| | |
|---|---|
| Polyester (Elitel (registered trademark) UE-9885 manufactured by Unitika Ltd.) | 20 parts by mass |
| MEK | 40 parts by mass |
| Toluene | 40 parts by mass |

A coating liquid with the following composition for forming a receiving layer was applied to the protective layer thus formed and was dried to form a receiving layer with a thickness of 2 μm. Thus, an intermediate transfer medium was obtained.
<Coating Liquid for Forming Receiving Layer>

| | |
|---|---|
| Vinyl chloride-vinyl acetate copolymer (Solbin (registered trademark) CNL manufactured by Nissin Chemical Industry Co., Ltd.) | 95 parts by mass |
| Epoxy-modified silicone oil (KP-1800U manufactured by Shin-Etsu Chemical Co., Ltd.) | 5 parts by mass |
| MEK | 200 parts by mass |
| Toluene | 200 parts by mass |

Examples 2 to 14 and Comparative Examples 1

A combination of a thermal transfer sheet and an intermediate transfer medium was produced in the same manner as in Example 1 except that the composition of the melt transfer coloring layer of the thermal transfer sheet and the composition of the receiving layer of the intermediate transfer medium were changed as shown in Table 1.

<<Evaluation of Transfer Layer Peeling Inhibitory Properties>>

The combinations of the thermal transfer sheet and the intermediate transfer medium produced in the examples and comparative examples, a poly(vinyl chloride) (PVC) card (54 mm in length×86 mm in width) serving as a transfer-receiving article, and a thermal transfer printer with a thermal head and a platen roller (PR-C201 manufactured by Canon Finetech Nisca Inc.) were provided.

With the thermal transfer printer, the sublimation dyes contained in the sublimation transfer coloring layers and the melt transfer coloring layer were transferred at a temperature of 10° C. and at a relative humidity of 30% from the thermal transfer sheet onto the receiving layer of the intermediate transfer medium to form a "pattern A" image. After image formation, the transfer layer on which the image was formed was transferred from the intermediate transfer medium onto the PVC card to produce a printed material.

Figure 8:
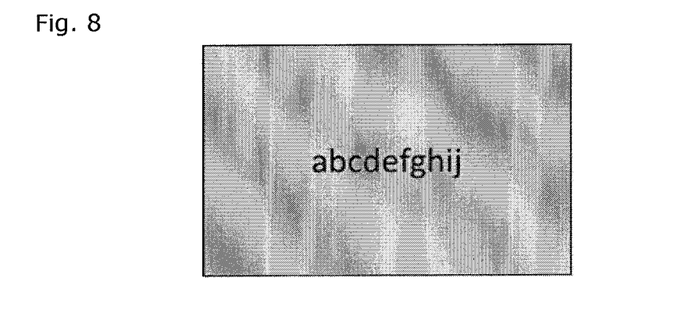
FIG. 8 is a front view of a printed material with a "pattern A" image produced for the evaluation of transfer layer peeling inhibitory properties and scumming inhibitory properties.

As illustrated in FIG. 8, the "pattern A" formed on the printed material was a black solid character image formed by the melt transfer coloring layer, which was formed at the center of a background image of a gray solid uniform image (128/255 image gray level) formed by the sublimation dyes.

The background image formed by the sublimation dyes in the printed material was observed by the naked eye and with a 20× magnifier and was evaluated on the basis of the following evaluation criteria. Table 1 shows the evaluation results.

(Evaluation Criteria)

A: Separation of the transfer layer was not observed in the background image forming portion by the naked eye and with the 20× magnifier.

B: Although separation of the transfer layer was not observed in the background image forming portion by the naked eye, separation of the transfer layer was observed with the 20× magnifier.

NG: Separation of the transfer layer was observed in the background image forming portion.

<<Evaluation of Scumming Inhibitory Properties>>

The background image forming portion of the printed material produced for the evaluation of the transfer layer peeling inhibitory properties was observed by the naked eye and was evaluated on the basis of the following evaluation criteria. Table 1 shows the evaluation results.

(Evaluation Criteria)
  A: No scumming was observed.
  NG: Scumming was observed.
<<Evaluation of Adhesion>>

Figure 9:
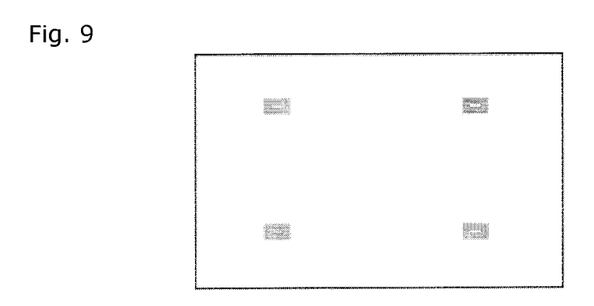
FIG. 9 is a front view of a printed material with a pattern image produced for the evaluation of adhesion.
Figure 10:
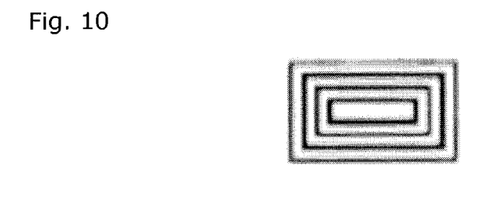
FIG. 10 is an enlarged view of the pattern image on the printed material of FIG. 9.

A printed material was produced in the same manner as in the evaluation of the transfer layer peeling inhibitory properties except that the temperature was changed to 20° C., the relative humidity was changed to 50%, and the formed image was changed to a pattern image illustrated in FIGS. 9 and 10.

An image formed in a printed material is formed by the melt transfer coloring layer and has a pattern as illustrated in FIG. 10 near four corners of the printed material (see FIG. 9).

The pattern image (line thickness: 2 dots) of the printed material was observed by the naked eye and was evaluated on the basis of the following evaluation criteria. Table 1 shows the evaluation results.
(Evaluation Criteria)
  A: No blurring was observed in the pattern image, and a good image was formed.
  B: Slight blurring was observed in the pattern image.
  C: Blurring was observed in the pattern image.

TABLE 1

|  | Release material content A of melt transfer coloring layer (mass %) | Release material content B of receiving layer (mass %) | B/A | A + B | Evaluation of transfer layer peeling inhibitory properties | Evaluation of scumming inhibitory properties | Evaluation of adhesion |
|---|---|---|---|---|---|---|---|
| Example 1 | 1 | 5 | 5 | 6 | A | A | A |
| Example 2 | 1 | 10 | 10 | 11 | A | A | A |
| Example 3 | 1 | 1 | 1 | 2 | A | A | A |
| Example 4 | 2.9 | 5 | 1.7 | 7.9 | A | A | A |
| Example 5 | 2.9 | 10 | 3.4 | 12.9 | A | A | B |
| Example 6 | 2.9 | 1 | 0.3 | 3.9 | A | A | A |
| Example 7 | 4.8 | 5 | 1 | 9.8 | A | A | B |
| Example 8 | 4.8 | 8 | 1.7 | 12.8 | A | A | B |
| Example 9 | 4.8 | 1 | 0.2 | 5.8 | A | A | B |
| Example 10 | 6 | 2 | 0.3 | 8 | A | A | B |
| Example 11 | 7.4 | 1 | 0.1 | 8.4 | A | A | C |
| Example 12 | 1 | 15 | 15 | 16 | A | A | C |
| Example 13 | 4.8 | 10 | 2.1 | 14.8 | A | A | C |
| Example 14 | 0.5 | 1 | 2 | 1.5 | B | A | A |
| Comparative example 1 | — | 5 | — | 5 | NG | NG | A |

Those skilled in the art will appreciate that a combination of a thermal transfer sheet and an intermediate transfer medium and the like according to the present disclosure are not limited to these examples, that the examples and the specification only illustrate the principles of the present disclosure, that various modifications and improvements may be made without departing from the gist and scope of the present disclosure, and that all the modifications and improvements fall within the scope of the present disclosure for which protection is sought. Furthermore, the scope for which protection is sought by the present disclosure includes not only the claims but also equivalents thereof.

REFERENCE SIGNS LIST 10 thermal transfer sheet
11 first substrate
12 melt transfer coloring layer
13 peeling layer
14 release layer
15 sublimation transfer coloring layer
16 back layer
20 intermediate transfer medium
21 second substrate
22 transfer layer
23 receiving layer
24 peeling layer
25 protective layer

The invention claimed is:

1. A combination of a thermal transfer sheet and an intermediate transfer medium,
  wherein the thermal transfer sheet comprises a PET film as a first substrate and a melt transfer coloring layer,
  wherein the intermediate transfer medium comprises a PET film as a second substrate and a transfer layer including a receiving layer,
  wherein the melt transfer coloring layer and the receiving layer contain a release material,
  wherein the melt transfer coloring layer and the receiving layer contain a vinyl resin,
  wherein the vinyl resin in each of the melt transfer coloring layer and the receiving layer is a vinyl chloride-vinyl acetate copolymer,
  wherein the release material comprises an epoxy-modified silicone oil,
  wherein the melt transfer color layer adheres to the receiving layer,
  wherein a ratio (B/A) of a release material content (B) of the receiving layer to a release material content (A) of the melt transfer coloring layer ranges from 0.3 to 11, and
  wherein a sum (A+B) of the release material content (A) of the melt transfer coloring layer and the release material content (B) of the receiving layer ranges from 2% by mass to 11% by mass.

2. The combination of the thermal transfer sheet and the intermediate transfer medium according to claim 1, wherein the melt transfer coloring layer has a release material content (A) in the range of 1% by mass to 5% by mass.

3. The combination of the thermal transfer sheet and the intermediate transfer medium according to claim 1, wherein the receiving layer has a release material content (B) in the range of 1% by mass to 10% by mass.

4. A method for producing a printed material, comprising the steps of:
  providing the combination of the thermal transfer sheet and the intermediate transfer medium according to claim 1;

transferring the melt transfer coloring layer from the thermal transfer sheet onto the receiving layer of the intermediate transfer medium to form an image; and transferring the transfer layer including the receiving layer, onto which the melt transfer coloring layer is transferred, from the intermediate transfer medium onto a transfer-receiving article.

5. The combination of the thermal transfer sheet and the intermediate transfer medium according to claim 1, wherein the thermal transfer sheet further comprises at last one sublimation transfer color layer arranged in a plane sequential manner with respect to the melt transfer coloring layer on the first substrate.

6. The combination of the thermal transfer sheet and the intermediate transfer medium according to claim 1, wherein the ratio (B/A) is in a range of 0.3 to 3.

7. The combination of the thermal transfer sheet and the intermediate transfer medium according to claim 1, wherein the sum (A+B) is in a range of 3% by mass to 9% by mass.

* * * * *